US011124079B2

United States Patent
Rodriguez Romero et al.

(10) Patent No.: US 11,124,079 B2
(45) Date of Patent: Sep. 21, 2021

(54) AUTONOMOUS ALIGNMENT OF A VEHICLE AND A WIRELESS CHARGING DEVICE

(71) Applicant: Valeo Schalter und Sensoren GmbH, Bietigheim-Bissingen (DE)

(72) Inventors: Mirian Rodriguez Romero, Bietigheim-Bissingen (DE); Ovidiu Buzdugan Romcea, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 265 days.

(21) Appl. No.: 16/506,245

(22) Filed: Jul. 9, 2019

(65) Prior Publication Data
US 2021/0008999 A1 Jan. 14, 2021

(51) Int. Cl.
*B60L 53/36* (2019.01)
*B60L 53/35* (2019.01)
*B60L 53/12* (2019.01)
*B60L 53/37* (2019.01)

(52) U.S. Cl.
CPC .............. *B60L 53/35* (2019.02); *B60L 53/12* (2019.02); *B60L 53/36* (2019.02); *B60L 53/37* (2019.02)

(58) Field of Classification Search
CPC .......... B60L 53/35; B60L 53/36; B60L 53/12; B60L 53/37; Y02T 90/14; Y02T 90/12; Y02T 10/7072; Y02T 10/70
See application file for complete search history.

(56) References Cited

U.S. PATENT DOCUMENTS

| | | | | |
|---|---|---|---|---|
| 9,660,487 B1 * | 5/2017 | Mu | ........................ | B60L 53/38 |
| 2016/0046198 A1 * | 2/2016 | Krammer | ................ | B60L 53/36 |
| | | | | 701/22 |
| 2016/0380487 A1 * | 12/2016 | Widmer | .................. | H02J 50/12 |
| | | | | 324/654 |
| 2019/0016331 A1 | 1/2019 | Carlson et al. | | |
| 2019/0016384 A1 | 1/2019 | Carlson et al. | | |

* cited by examiner

*Primary Examiner* — Daniel Cavallari
(74) *Attorney, Agent, or Firm* — Osha Bergman Watanabe & Burton LLP

(57) ABSTRACT

A method for autonomous alignment of a vehicle and a stationary wireless charging device, including scanning of the vehicle surrounding for a stationary wireless charging device and in case a wireless charging device is detected, determining the vehicle position, comparison of the actual vehicle position and a catalogue of vehicle positions, d) based on the outcome of the comparison, in case that the actual vehicle position is already in the catalogue of vehicle positions, selection of a trained alignment trajectory from the catalogue, or in case that the actual vehicle position is not in the catalogue of known vehicle positions, planning of a new alignment trajectory in order to align the vehicle and the detected stationary wireless charging device, and tracking of the vehicle position and autonomous alignment of the vehicle and the detected stationary wireless charging device based on the alignment trajectory obtained in the previous step.

10 Claims, 2 Drawing Sheets

AUTONOMOUS ALIGNMENT OF A VEHICLE AND A WIRELESS CHARGING DEVICE

The present invention concerns a method for autonomous alignment of a vehicle and a stationary wireless charging device, wherein the method at least includes:

a) scanning of the vehicle surrounding for a stationary wireless charging device and in case a wireless charging device is detected, b) determination of the vehicle position, c) comparison of the actual vehicle position and a catalogue of vehicle positions;

d) based on the outcome of the comparison in method step c):

d1) in case that the actual vehicle position is already in the catalogue of vehicle positions, selection of a trained alignment trajectory from the catalogue, d2) in case that the actual vehicle position is not in the catalogue of known vehicle positions, planning of a new alignment trajectory in order to align the vehicle and the detected stationary wireless charging device, and e) tracking of the vehicle position and autonomous alignment of the vehicle and the detected stationary wireless charging device based on the alignment trajectory obtained in step d). In addition, the present invention concerns a system adapted to perform the inventive method and a vehicle comprising such system.

BACKGROUND

Autonomous vehicle driving is a complex process and safe and efficient solutions for a user cannot only focus on the once implemented rules for the interaction between vehicle and surrounding. Based on the fast development in this technological field new tasks emerge, either triggered by technical changes or improvements of the vehicles or by alterations of the traffic condition. Especially, in the latter category the appearance of new traffic participants, e.g. e-scooter or e-bikes, have to be concerned and implemented. The necessity to adapt the technical systems gets even more complicated in cases, wherein both factors, the vehicle and the vehicle surrounding, are altered and, in addition, the alterations are interrelated. Nowadays, such situations arise for instance in the field of electrically powered vehicles and the necessity to re-charge the vehicle conveniently. Both topics are interconnected and the vehicle and the vehicle systems have to be adapted to new electrically charging solutions and vice versa. Such interconnections are of importance particularly for autonomous vehicle systems, which have to provide the safety and convenience to handle the new task under altered side-conditions.

Several methods for autonomous vehicle positioning in relation to associated electronic hardware can be found in the literature.

US 2019/0016331 A1 for instance disclose a method comprising: localizing an autonomous vehicle relative to a first geographical location at which the autonomous vehicle is disposed relative to a first path portion of a path of travel; capturing data representing vehicular drive parameters at units of time as the autonomous vehicle transits via the path of travel; determining the autonomous vehicle is adjacent to a parking zone; localizing the autonomous vehicle relative to a second geographical location at which the autonomous vehicle is disposed relative to a second path portion of the path of travel; storing the data representing the vehicular drive parameters; and computing a reverse path of travel in a reverse direction of travel over the path of travel based on the data representing the vehicular drive parameters.

Another solution is suggested by US 2019/0016384 A1. The document discloses a method comprising: computing vehicular drive parameters with which to apply to a vehicle controller to facilitate driverless transit of an autonomous vehicle coextensive with a path of travel to a destination geographical location; accessing map data to identify a boundary including the destination geographical location and a portion of the path of travel; detecting the autonomous vehicle is within a range of distances relative to the boundary; accessing executable instructions to facilitate vectoring the autonomous vehicle in accordance with an approach maneuver; and applying a subset of vehicular drive parameters to guide the autonomous vehicle to a termination point.

Nevertheless, besides the already existing approaches in the prior art there is still the need to provide improved autonomous driving methods and systems, wherein the vehicles are able to manage difficult re-charging situations without the need of too much user input.

SUMMARY

Therefore, it is the task of the current invention to overcome, at least in part, the drawbacks of the state of the art. Especially, it is a task of the current invention to provide a safe and convenient method and system, which are able to autonomously manage the alignment process of a vehicle and a charging device.

The above mentioned task is solved by a method comprising the features according to the independent claim 1. In addition, the task is further solved by a system according to the technical features of claim 9 and a vehicle comprising said inventive system according to claim 10. Preferred embodiments of the invention are also defined by the features of the dependent claims, by features disclosed in the description and in the figures, wherein a feature aggregation of separated parts is within the scope of the invention, unless explicitly excluded.

It is within the scope of the present invention to disclose a method for autonomous alignment of a vehicle and a stationary wireless charging device, wherein the method at least comprising the steps of:

a) scanning of the vehicle surrounding for a stationary wireless charging device and in case a wireless charging device is detected;

b) determination of the vehicle position;

c) comparison of the actual vehicle position and a catalogue of vehicle positions;

d) based on the outcome of the comparison in method step c):

d1) in case that the actual vehicle position is already in the catalogue of vehicle positions, selection of a trained alignment trajectory from the catalogue;

d2) in case that the actual vehicle position is not in the catalogue of known vehicle positions, planning of a new alignment trajectory in order to align the vehicle and the detected stationary wireless charging device;

e) tracking of the vehicle position and autonomous alignment of the vehicle and the detected stationary wireless charging device based on the alignment trajectory obtained in step d).

It was found, that above described method is able to deliver a fast, save and reliable automatic alignment procedure between a vehicle and a charging station, wherein especially the automatization eases the situation for the driver in complicated driving situations and assures an efficient and fast energy transfer, because the vehicle and the pad are optimally aligned. This overall advantage is achieved, because the method does not only rely on a simple algorithm to detect the exact position of the wireless charge pad, but also combines the detection with a path planning function. In addition, the paths are recorded and may be replayed initiated by the driver every time the vehicle is at the same start position. One possible application is for instance, that the charging device is located in a private garage and every time the user places the car at its entrance, the system will take over vehicle control and perform the correct path to align the car with the wireless charging device, based on the previously recorded and saved path. Such combination of different features enables a faster and safer process, because the system does not have to perform a trajectory planning each and every time, but can select already learned and safe trajectories. Therefore, even difficult to handle driving situations can be handled and the system performance is continuously improved. Such method is more convenient and reliable compared to other alignment methods or systems, based on display graphics comprising a trajectory overlay, only. In addition, the state-of the art process are based on manual steering operations of the user, instead of an autonomous navigation by the vehicle itself. Especially, the latter enables a safer process, because user based manual mistakes and uncertainties are excluded.

The inventive method is a method for autonomous alignment of a vehicle and a stationary wireless charging device. An autonomous alignment between a vehicle and a charging station is achieved by driving operations, e.g. change of the steering angle or change of the vehicle speed, wherein the driving operations are not caused by a manual interference of the driver or user, but wherein the driving operations are performed by a vehicle system. The alignment is also autonomous in cases, wherein some operations, e.g. the method start, is based on a manual operation or input by the user. The autonomous alignment can for instance be performed in cases, wherein the vehicle user or driver is outside of the car. The alignment includes that the vehicle position is changed relative to the charging device and usually a defined end position, e.g. a fixed position between the vehicle and the device is achieved. The fixed position may include the coordinates of device and vehicle and the angular orientation between them. Vehicles in the sense of the invention may for instance be electric cars or busses. It is also possible that the vehicles are hybrid vehicles and comprise two different engine types, e.g. a combustion and an electric motor. A stationary wireless charging station is a charging station, wherein the position and relative orientation of the charging station is fixed with respect to the environment. Such a charging station can for instance be a charging pad located at the floor of a garage or parking slot. The charging is wireless in cases, wherein no cable has to be attached between the charging device and the vehicle for energy transfer.

In method step a) the vehicle surrounding is scanned for a stationary wireless charging device. The first method step includes the automatic detection of a charging device in the vehicle surrounding. This is done by using one or more scan devices which are able to detect the charging device. Suitable scan devices can either be based on visual or electrical detectors. Visual detectors can for instance be cameras, like CCD-cameras, or laser scanner, like LIDAR. Suitable pattern recognition routines can be implemented and enable the detection of specific optical features of the charging device. It is also possible that the charging device is located by electrical sensors, like magnetic or electric sensor, which are able to track the device electromagnetically. In addition, it is also possible that the charging device comprises WLAN, RFID or other signal transducing means, enabling an information interchange between the vehicle and the charging device.

In case a wireless charging device is detected in method step a) the method proceeds to method step b) and determines the vehicle position. The determination of the vehicle position can be performed using any coordinate system suitable for that purpose. For instance, it is possible to use the global GPS-system to define the vehicle location. Alternatively, it is also possible to use a coordinate system specific for this surrounding, e.g. based on one or more specific WLAN signals in that surrounding or even to use a coordinate system based on the vehicle odometry, only.

In method step c) a comparison of the actual vehicle position and a catalogue of vehicle positions is performed. Based on the determined position it is possible to perform a comparison, whether or not the method has already been performed from the actual position. For this purpose, the vehicle position and the specific coordinate system can be used. Within the uncertainty of the coordinate determination and within a pre-defined uncertainty interval, several vehicle positions can be grouped to a unique vehicle starting position. For instance, it is possible that within a certain "uncertainty" range of e.g. 5 m all determined vehicle positions are defined as the same starting point, e.g. in front of a garage in the home zone. The measurement and definition uncertainties can be a function of the used coordinate system and implemented in the comparison routine. The catalogue of different vehicle positions can be a database including different center (GPS) coordinates and also including an uncertainty interval in meter. All vehicle positions within the uncertainty interval from the center point are identified as belonging to the same starting point.

In method step d) the outcome of the comparison in method step c) is evaluated and as a function of the outcome a trained alignment trajectory from the catalogue can be selected in step d1). This alternative is chosen in case that the actual vehicle position is already in the catalogue of vehicle positions and the vehicle is on or near the defined vehicle position in the catalogue. It is also possible in this step that the vehicle positions are defined in absolute values without any position uncertainty and that the uncertainty and the allowed difference in the position is included in this comparison step. If the method detects that this charging device has already been part of a trajectory planning in this routine and that a safe trajectory is present in the system, the safe and trained trajectory is chosen.

Alternatively, the planning of a new alignment trajectory can be performed in order to align the vehicle and the detected stationary wireless charging device. This is done of step d2), in case that the actual vehicle position is not in the catalogue of known vehicle positions. In case that the current vehicle system suggests that this position is a "new" position, e.g. a charging device in a different city, the system is not able to find an already saved trajectory for approaching the device from the current vehicle position in the system.

In method step e) the vehicle position is tracked and an autonomous alignment of the vehicle and the detected stationary wireless charging device based on the alignment trajectory obtained in step d) is performed. Within this step the car is automatically moved along the chosen or calculated trajectory and, therefore, the distance between vehicle and device is reduced. At the end of the trajectory the vehicle is within a fixed distance and angular orientation between to the charging device. Tracking of the vehicle position includes the monitoring of the actual vehicle position on the trajectory. The latter can be performed by car odometry or any other method suitable for assessing the car position and orientation during an autonomous driving process. It is also possible to perform this function by using sensors mounted on one or more parts of the infrastructure surrounding the charging device.

In a preferred embodiment of the method the detection of the stationary wireless charging device in method step a) can be based on an optical detection system. The optical detection of the charging device has been found useful, because the pattern recognition and thus the determination of the charging device can be performed reliably and fast. For this purpose, one or more cameras at the vehicle, at the device, the infrastructure or a combination of different camera positions can be used.

In a further preferred embodiment of the method the detection of the stationary wireless charging device at least comprises the detection of the wireless charging device coordinates and angle. For an efficient wireless charging process, it has been found useful not only to align the specific coordinates of the vehicle and the device, but to align also an angle between vehicle and device. The coordinates can for instance be the coordinates of center portion of the device and the center of the vehicle. For the angular alignment for instance the middle axes of the vehicle and a symmetry axes of the charging device can be chosen. Therefore, the angular orientation between the stationary and the vehicle charging devices can be matched. This match between the different charging devices may increase the efficiency of the energy transfer and thus accelerate the overall charging process.

In another aspect of the method in step b) a user input can be requested whether to perform the following methods steps for the current position or to abort the method. For a large number of use cases it has been found favorable, that before starting the overall automatic method a confirmation of the user is requested. This sub-step may be performed manually, e.g. confirming the following process by pressing a button, or alternatively by a voice command. In addition, it is possible that the confirmation process is linked to further conditions of the vehicle. For instance, the request can be linked to the charging condition of the vehicle battery. If the battery is near full, then the request can be the display of a small button on a vehicle screen for only a couple of seconds, only. This set-up saves time and increases the overall performance of the method.

Within a further preferred characteristic of the method in step d2) the user can be requested to change the vehicle position in cases, wherein no safe alignment trajectory can be planned. In certain cases, it may be impossible to plan a reasonable and safe trajectory in the current driving situation because the surrounding of the charging device allows no path without the possibility to interfere with the device surrounding. This assessment may for instance be based on the data obtained in step b), wherein the device surrounding is assessed. Based on the data of the device surrounding, it might be possible to find a saved trajectory and if such trajectory can be found the user can be guided by the method to the starting point of the saved trajectory. If in no case a trajectory can be planned, it is also possible to inform the user to abort the overall method. This sub-step may reduce the time requirement for processing and ensures an easy and fast processing of the right trajectory.

In another preferred aspect of the method the vehicle position in step b) and/or the new trajectory obtained in method step d2) can be stored in the catalogue of vehicle positions. In order to generate a unique identifier for the identification of the charging device, which can be used to recognize the same charging device in the future, it has been found helpful to store either the vehicle position at the beginning of the maneuver or to store the overall trajectory, inter alia including the starting position. Of course the information content of the overall trajectory is higher and also includes the learned trajectory which has at least once safely been used. Therefore, besides the identification of the device also learned and safe alternatives are provided, which may increase the overall processing speed. In addition, it is possible to store more than one trajectory and generate in the course of time a library of different usable trajectories. This may be useful to choose alternatives in cases, wherein one already learned trajectory is blocked.

In a further embodiment of the method in step e) additionally the vehicle surrounding can be checked and the checking can be based on at least one camera or laser scanning system mounted on the vehicle or mounted on the infrastructure of the stationary wireless charging device. In order to monitor the vehicle surrounding in the autonomous maneuver situation it has been found useful to use an optical camera or laser based systems. In the short range driving situation camera-surveillance for instance is fast and sufficient to detect suddenly appearing obstacles like pedestrians crossing the learned trajectory. In these cases, it is possible that the checking also includes an autonomous vehicle reaction, like accelerating or stopping the vehicle. If the maneuver is performed from in- or outside the vehicle a smartphone or tablet can be used. The user has complete visibility of the maneuver thanks to different display views and overlays provided by the camera or surround view camera system, for instance in cases where 4 cameras are available. The display can be configurable, to output, for example, the front view, rear view, 360° view, bowl view, transparent vehicle view by using the current and previous images recorded by the front or rear camera and projected on a top view image. This configuration allows the user to perform by himself the maneuver using the display and visual overlays that will guide him towards the target in case the lateral and longitudinal control of the vehicle cannot be activated. In such cases the system may additionally provide the user the required steering wheel angle and the remaining distance to be driven. This can help to increase the safety of the autonomous vehicle operation.

In another preferred aspect of the method after passing 50% and 100% of the alignment trajectory length in step e), additionally the intensity of electromagnetic signals can be recorded by an electromagnetic detection device and the remaining alignment trajectory can be confirmed or changed based on the electromagnetic signal intensity. For a perfect alignment of the vehicle and the charging device, for instance a charging pad, it has been found useful to integrate also another detection device, which is very sensitive to the final alignment between the charging device and the vehicle. Based on the fact that this device is only used in the vicinity of the charging device, energy can be saved, because the device is only used when needed. Therefore, at the beginning of the alignment process the trajectory is only followed by different detector, e.g. a camera, and only later on, the electromagnetic detection device is used, because in the near range region close to the device the electromagnetic detector comprises a higher sensitivity. In addition, the charge pad may comprise a signal transmission device and the vehicle/ user can be informed in case there is a charge pad in the vicinity of the vehicle. So the system can start searching for it and subsequently for a path towards it or in case there is a path already recorded, if there is a valid path towards the target. This will improve the reaction time of the system and will be more comfortable for the user and, consequently, a higher alignment precision can be obtained at high speed and the necessary overall energy consumption for the detectors is reduced.

In addition, also a system for autonomous alignment of a vehicle and a stationary wireless charging device is within the scope of invention, wherein the system is adapted to perform the inventive method. The system may include sensors for tracking the vehicle and the charging device, sensors for vehicle odometry, communication means for communicating to sensors in the surrounding and/or the charging device, wherein the communication means can e.g. be wired or wirelessly with a mobile device, such as a mobile phone or computing device, a computing unit including a processor responsive to executing the instructions, a memory for the catalogue and a memory including executable instructions, wherein the executable instructions are at least the instruction defined by the inventive method as described above. The system at least is able to perform the following functions.

A Computer vision algorithm: this algorithm is in charge of detecting the exact charge pad position (x,y,z and angle) in a determined location (garage, public parking . . . ).

Path planning: This function is in charge of calculating a vehicle's path towards the charge pad based on its coordinates provided by the computer vision algorithm for a correct alignment between the charge pad and the vehicle.

Training and Replay of the path planning: after the system has been trained with the calculated path, it shall save it, in order to replay later. In addition, the system shall be able to localize the vehicle in the environment, to be able to adjust its trajectory to the saved one and to be able to replay the same path and finish the maneuver in the same target position (the position of the charge pad).

Collision avoidance: the system includes detection sensors that prevent the car to hit any object. To perform this function, the required sensors can be either mounted on the car or part of the infrastructure.

For the advantages of the inventive system it is explicitly referred to the advantages described for the inventive method.

Furthermore, also an electric vehicle comprising the inventive system is within the scope of the invention. The electric vehicle at least in part is adapted for autonomous driving and at comprises at least an electric motor adapted to move the vehicle. Therefore, the electric vehicle can be an electric car or a hybrid car, comprising a combustion as well as an electric engine. For the advantages of the inventive car it is explicitly referred to the advantages of the inventive system and the advantages of the inventive method.

Further advantages and preferred embodiments of the invention are displayed and discussed in the figures below. It is explicitly outlined that the figures do show examples only and it is not intended that the scope of invention is in any way limited by those figures.

BRIEF DESCRIPTION OF THE DRAWINGS

The figures show.

DETAILED DESCRIPTION

Figure 1:
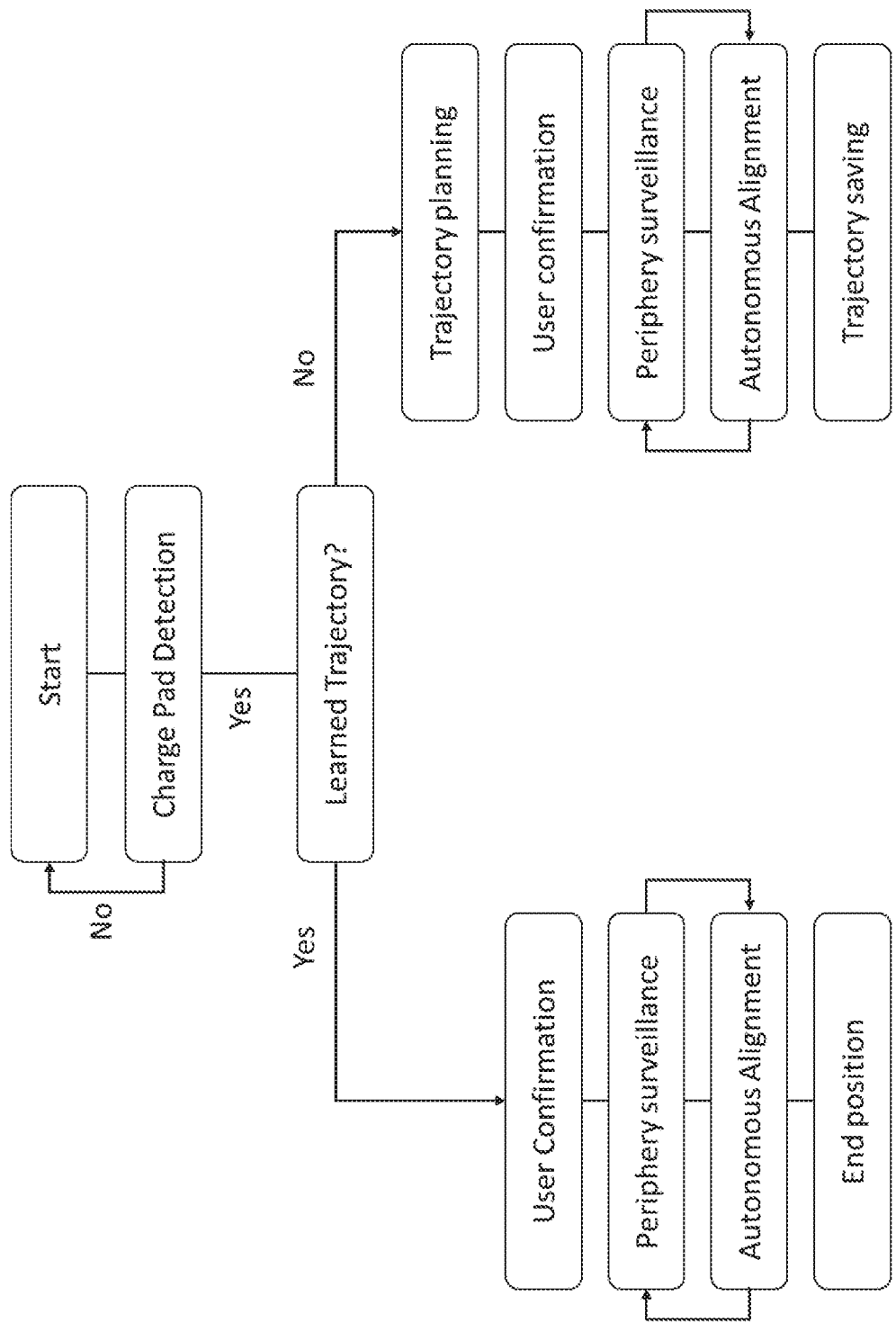
FIG. 1 a schematic diagram of an embodiment of the inventive process.

FIG. 1 displays an alternative tree of the inventive method at hand. In the simplest way the system searches for a stationary charge pad, e.g. visually by a camera system, and proceeds in the case a charge pad is detected. Based on the current vehicle position it is decided, whether or not an already learned trajectory for the situation at hand is in the system. If the same position was already learned before, a learned trajectory is provided by the system and the vehicle can proceed on the proposed trajectory. The autonomous driving on the trajectory is controlled by different sensors, wherein the sensors are used for determination of the vehicle position and for surveillance of the periphery. Based on the latter an emergency stop can be initiated, for instance if an object suddenly appears on the trajectory. For future use all of the periphery and the trajectory data can be saved to the system. The vehicle and the charging pad are aligned, wherein not only the relative position of the vehicle and pad centers but also the angular alignment between pad and vehicle axes are controlled. A similar autonomous part can be used for an unknown starting position, wherein trajectory planning based on the vehicle position and the environment data is performed by the system. Also in this case an autonomous alignment is performed and the overall process tracked for security reasons and the data stored to the system. Furthermore, the catalogue or the database is updated and now it is integrated in the system that this position is a known position and a learned trajectory is available for future use.

Figure 2:
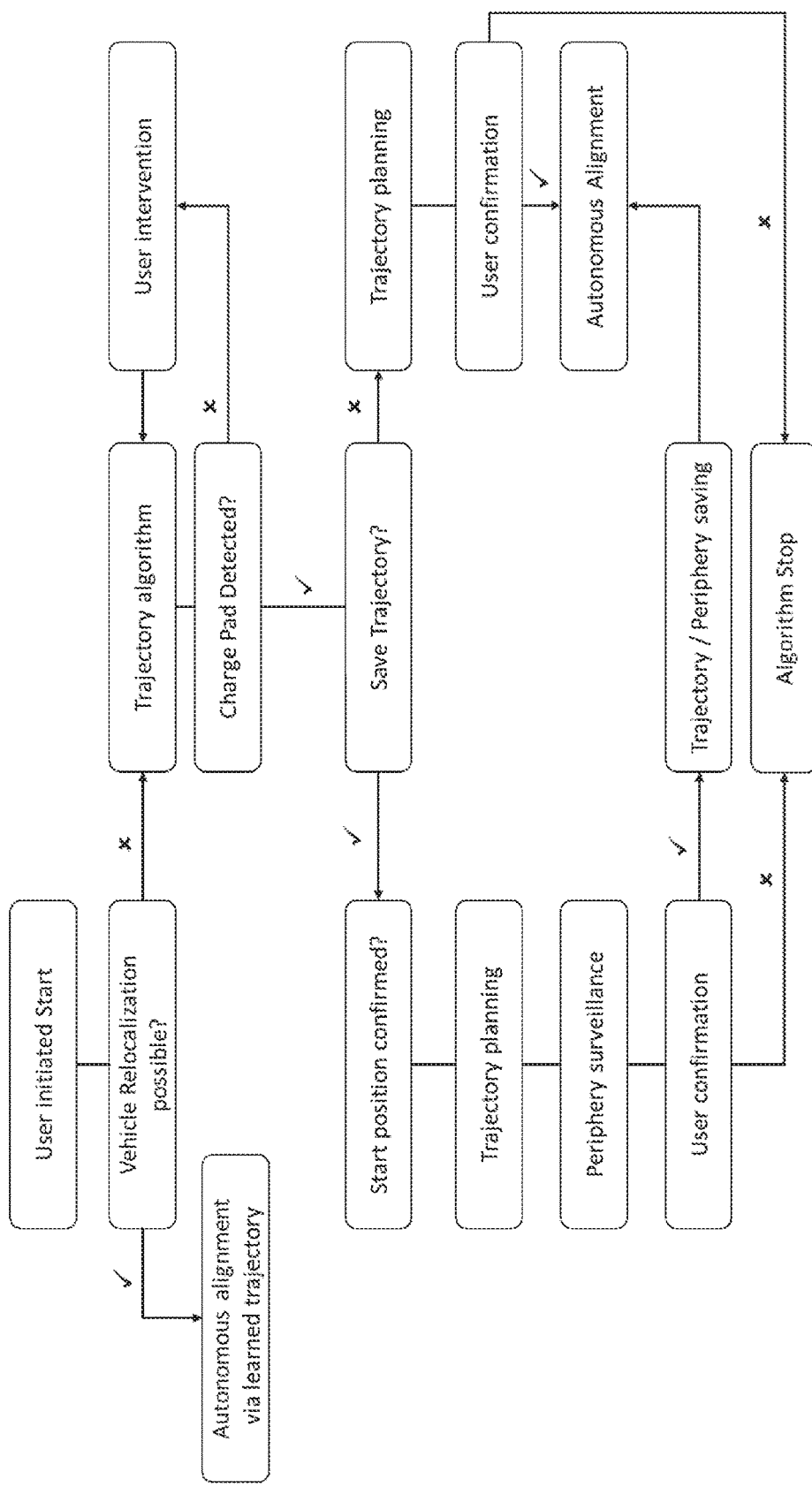
FIG. 2 a schematic diagram of a further embodiment of the inventive process.

FIG. 2 also shows a more detailed preferred embodiment of the inventive process. The overall method may start either initiated by the driver of the electric car, e.g. by pushing a button or submitting a voice command. For instance, it is possible that the method is started, when the vehicle is in front of the user's home garage. The method may further include an assessment, whether or not there is room to maneuver the car at this position, wherein a method start is requested. Such assessment can for instance be based on the generated data in search for the charging device. In the case that the charging device, for instance a charging pad located at the floor of the garage, is detected, the method compares the current vehicle position with a catalogue of different vehicle positions. Based on the current situation the system recognizes the position "home garage" and provides the trajectory to move the car in the right alignment above the charge pad. It is also possible that the method requests to move the vehicle to a different, but defined starting position, e.g. in cases, wherein the system recognizes that from the first starting point no safe trajectory is available or in the case that another trajectory from a different starting point is safer. While the user drives to the start position, the detection algorithm continues detecting/tracking the path towards the pad until the start position has been reached. If the pad detection is not possible anymore, because of an unknown obstacle, the algorithm can track the pad based on vehicle or vision odometry. Once the starting position is reached the overall maneuver may be started autonomously or after user confirmation. The maneuver may be started for instance by a signal of a touchscreen, button or handheld device, e.g. a smartphone, and the vehicle user can be outside of the car when using the handheld. It is also possible that the user or driver stays in the vehicle during the autonomous parking procedure. As explained above, preferably the charge pad is recognized a camera based algorithm or visually. The detection can further be optimized by a specific shape or image pattern on the top or sides of the charge pad. The latter can be detected by the computer vision algorithm. It has been found that it is possible to perform the overall process using only one camera unit, but more can be used to extend the use cases of the system.

In case that the charge pad is detected, the starting position is reached and the method is started, the actual starting position is compared with a catalogue of known and learned starting positions or trajectories. If the current position is already learned and stored in the system, the trajectory is provided by the system and autonomous driving starts. Simultaneously, the driving on the trajectory and the surrounding is monitored by further sensors (ultrasonic, camera, radar, laser) and in case of any incident, e.g. a pedestrian, the autonomous alignment can be halted or stopped based on the surveillance outcome. If the learned trajectory can be passed without any hindrances, the end position is reached and the vehicle and the charge pad are aligned and ready for charge transfer. The final alignment is achieved not only by positioning the center of the pad and e.g. the center of the vehicle axle (rear or front), but also the orientation of the vehicle and the charge pad is considered. The complete maneuver can further be recorded and saved by the system so that it can later be reproduced every time the car is at the same or similar start position (including some x,y and rotation tolerances).

If the starting position is unknown to the system, i.e. not stored in the catalogue or database, trajectory planning is performed by the system. A path is calculated or planned and if a save trajectory can be found the starting of the maneuver can be initiated by a user confirmation. Here it is also possible that the user suggests a different starting position and the overall method starts after reaching the suggested starting position. For instance, the charge pad may be located "unknown" to the system inside of a garage and the user wants to save a trajectory for this new scenario. The user drives towards the charge pad in order to detect it. In the moment the system detects the charging device it may be the case that the current position does not satisfy the user requirements for future usage (e.g. half of the car is already inside the garage). In this case the system offers the user the possibility to start the trajectory from an earlier position, for example from the front of the garage, or from the street/ entrance of the building, from where the charge pad is too far to be detected. During the update of the start position, the charge pad will be continuously tracked, both visually and where not possible, based on the odometry of the vehicle. Of course, also the maneuver on the unknown path is monitored by different sensors and the overall process halted in case of any incident. Furthermore, the environment scanning data can be saved to the system and changes over time can be monitored. During autonomous driving the lateral and the longitudinal vehicle position is changed by the car without any user or driver interference. If the final alignment is achieved the overall trajectory, position and surrounding can be stored in the database. The trajectory for an unknown charging pad is now learned and stored in the system.

What is claimed is:

1. A method for autonomous alignment of a vehicle and a stationary wireless charging device, comprising:
    a) scanning of the vehicle surrounding for a stationary wireless charging device and in case a wireless charging device is detected;
    b) determination of the vehicle position;
    c) comparison of the actual vehicle position and a catalogue of vehicle positions;
    d) based on the outcome of the comparison in method step c):
        d1) in case that the actual vehicle position is already in the catalogue of vehicle positions, selection of a trained alignment trajectory from the catalogue;
        d2) in case that the actual vehicle position is not in the catalogue of known vehicle positions, planning of a new alignment trajectory in order to align the vehicle and the detected stationary wireless charging device; and
    e) tracking of the vehicle position and autonomous alignment of the vehicle and the detected stationary wireless charging device based on the alignment trajectory obtained in step d).

2. The method according to claim 1, wherein the detection of the stationary wireless charging device in method step a) is based on an optical detection system.

3. The method according to claim 1, wherein the detection of the stationary wireless charging device at least comprises the detection of the wireless charging device coordinates and angle.

4. The method according to claim 1, wherein in step b) a user input is requested whether to perform the following methods steps for the current position or to abort the method.

5. The method according to claim 1, wherein in step d2) the user is requested to change the vehicle position in cases, wherein no safe alignment trajectory can be planned.

6. The method according to claim 1, wherein the vehicle position in step b) and/or the new trajectory obtained in method step d2) are stored in the catalogue of vehicle positions.

7. The method according to claim 1, wherein in step e) additionally the vehicle surrounding is checked and the checking is based on at least one camera or laser scanning system mounted on the vehicle or mounted on the infrastructure of the stationary wireless charging device.

8. The method according to claim 1, wherein after passing 50% and 100% of the alignment trajectory length in step e), additionally the intensity of electromagnetic signals is recorded by an electromagnetic detection device and the remaining alignment trajectory is confirmed or changed based on the electromagnetic signal intensity.

9. A system for autonomous alignment of a vehicle and a stationary wireless charging device, wherein the system is adapted to perform the method according to claim 1.

10. An electric vehicle comprising a system according to claim 9.

* * * * *

UNITED STATES PATENT AND TRADEMARK OFFICE
CERTIFICATE OF CORRECTION

PATENT NO. : 11,124,079 B2
APPLICATION NO. : 16/506245
DATED : September 21, 2021
INVENTOR(S) : Mirian Rodriguez Romero et al.

Page 1 of 1

It is certified that error appears in the above-identified patent and that said Letters Patent is hereby corrected as shown below:

In the Claims

Claim 8, Column 10, Line 47, the words "50% and 100%" should read -- $\geq 50\%$ and $\leq 100\%$ --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*